UNITED STATES PATENT OFFICE.

KIICHI MIYAKE, OF TOKYO, JAPAN.

RAW MATERIAL FOR WOVEN ARTICLES AND PROCESS OF MANUFACTURING IT.

1,316,848. Specification of Letters Patent. Patented Sept. 23, 1919.

No Drawing. Application filed April 26, 1918. Serial No. 231,006.

*To all whom it may concern:*

Be it known that I, KIICHI MIYAKE, a subject of the Emperor of Japan, and residing at No. 90 Rokuchome, Aoyama Minami-cho, Akasaka, Tokyo, Japan, have invented certain new and useful Improvements in Raw Materials for Woven Articles and Processes of Manufacturing Them, of which the following is a specification.

This invention relates to a raw material for woven articles, which material is obtained by subjecting fresh leaves of cocoa-nut palm (*Cocos nucifera*) in the successive operations of boiling in water and tearing into strips of suitable breadth, infusing in a chemical solution, washing with water and finally of natural drying; and also a process of manufacture including the said operations. The pieces of raw material, namely, the strips thus obtained, have good strength and elasticity. The material is very light while of very good durability. Therefore the raw material according to this invention is very suitable for manufacturing woven articles in general and especially for hats, bonnets, mats, slippers, bags, etc.

As above stated, the characteristic point of this invention is to originate an excellent utilization of leaves of cocoa-nut palm which were hitherto considered as a waste material. This palm grows, as well known, in almost all of South Sea Islands and other tropical regions, now according to this invention, fresh leaf of the cocoa-nut palm is first boiled in water for a short time and is torn apart into upper and lower halves. Then each half is torn by hand or by convenient mechanical devices into strips or bands of suitable breadth. These strips or bands are boiled from one to two hours in a solution consisting of 5 to 8 lbs. of sodium carbonate, dissolved in 100 lbs. of water. After the above treatment, the material is once washed by clean water to eliminate various impurities. Then this is put in a bleaching solution made up of 100 lbs. of water, 1 to 3 lbs. of sodium peroxid, 1 to 2 lbs. of potassium oxalate and 50 to 100 grams of sulfuric acid, and soaked therein from 1 to 3 days. During this operation the material is preferably agitated from time to time. After the completion of the bleaching, the material is well washed by water and dried in the shade while being exposed to the wind.

The strip of the torn leaves thus treated, curls inwardly from both edges thereof when dried, and becomes a smooth, semi-transparent thread (or strand) which is strong, elastic and light and has a good feeling. Moreover, it is quite waterproof. Therefore a hat or bonnet made therefrom does not deform nor decolorize after a long period. Hitherto, the best summer hat or bonnet is considered to be true Panama hat. But comparing those which were made of the product of this invention to the true Panama hat, it is of superior quality in every respect. Moreover, the thread thus obtained can be used for the manufacture of various kinds of cloth, mats, bags, slippers, etc., all of which will have a good appearance as well as great durability.

I claim:

1. A raw material for woven articles existing in the form of lengthwise curled strips of the hard matter of the leaves of the cocoanut palm, such material being obtainable by subjecting leaves of cocoanut palm to the successive steps of tearing into strips, boiling in an alkaline solution, soaking in a bleaching solution, washing in water, and finally natural drying, substantially as set forth.

2. A process of manufacturing raw material suitable for the manufacture of woven articles, such process consisting in tearing the leaves of the cocoanut palm into strips, boiling the same in an alkaline solution, soaking in a bleaching solution, washing in water and finally drying, substantially as described.

3. A process of making a raw material suitable for the manufacture of woven articles such process comprising the step of tearing the leaves of the cocoanut palm into lengthwise strips, boiling the strips in an alkaline solution, soaking in a bleaching solution comprising sodium peroxid, potassium oxalate and sulfuric acid, washing and drying the same at about atmospheric temperature, substantially as described.

In testimony whereof I have hereunto set my hand in presence of two subscribing witnesses.

KIICHI MIYAKE.

Witnesses:
GENJI KURIBARA,
SUGAO SOGA.

Copies of this patent may be obtained for five cents each, by addressing the "Commissioner of Patents, Washington, D. C."